(12) United States Patent
Hinz et al.

(10) Patent No.: US 7,118,183 B2
(45) Date of Patent: Oct. 10, 2006

(54) HYDRAULIC UNIT FOR AN ANTI-SLIP BRAKE SYSTEM

(75) Inventors: Axel Hinz, Neu-Anspach (DE); Hans-Dieter Reinartz, Frankfurt (DE); Petra Fischbach-Borazio, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/502,494

(22) PCT Filed: Jan. 9, 2003

(86) PCT No.: PCT/EP03/00134

§ 371 (c)(1),
(2), (4) Date: Jul. 23, 2004

(87) PCT Pub. No.: WO03/066403

PCT Pub. Date: Aug. 14, 2003

(65) Prior Publication Data

US 2005/0146210 A1    Jul. 7, 2005

(30) Foreign Application Priority Data

Feb. 8, 2002   (DE) .............................. 102 05 279
Aug. 13, 2002  (DE) .............................. 102 36 966

(51) Int. Cl.
*B60T 8/36* (2006.01)

(52) U.S. Cl. .............. 303/119.3; 303/20; 303/DIG. 10

(58) Field of Classification Search ............ 303/119.1, 303/119.2, 119.3, 20, DIG. 10
See application file for complete search history.

(56) References Cited

U.S. PATENT DOCUMENTS

| | | | | |
|---|---|---|---|---|
| 5,244,262 A | * | 9/1993 | Kehl et al. .............. | 303/119.3 |
| 6,102,495 A | * | 8/2000 | Zaviska .................. | 303/116.4 |
| 6,869,152 B1 | * | 3/2005 | Weh et al. .............. | 303/116.4 |
| 6,877,822 B1 | * | 4/2005 | Dinkel et al. ........... | 303/119.3 |

FOREIGN PATENT DOCUMENTS

| | | |
|---|---|---|
| DE | 195 00 350 A1 | 7/1996 |
| DE | 196 43 289 A1 | 4/1998 |
| DE | 197 24 166 A1 | 12/1998 |
| EP | 0 787 084 B1 | 8/1997 |

OTHER PUBLICATIONS

German Search Report of Application No. 102 36 966.6 dated Jan. 13, 2004.
International Search Report of Application No. PCT/EP03/00134 dated May 8, 2003.

* cited by examiner

*Primary Examiner*—Devon C. Kramer
(74) *Attorney, Agent, or Firm*—RatnerPrestia

(57) ABSTRACT

The present invention relates to a hydraulic unit whose ventilation system includes a pressure compensating channel (1) that extends transversely to the motor- and pump accommodating bore (2, 11) from the second housing surface (A2) through the motor accommodating bore (2) in the direction of a third housing surface (A3) in the accommodating member (3) positioned diametrically to the second housing surface (A2).

19 Claims, 2 Drawing Sheets

HYDRAULIC UNIT FOR AN ANTI-SLIP BRAKE SYSTEM

TECHNICAL FIELD

The present invention relates to a hydraulic unit, in particular for slip-controlled brake systems.

BACKGROUND OF THE INVENTION

EP 0 787 084 B1 discloses a hydraulic unit of the indicated type which includes a ventilation system with one single ventilation point to the atmosphere aligned coaxially to the motor accommodating bore for the purpose of central ventilation of the accommodating bores. To this end, the motor accommodating bore is configured as a through-bore in the accommodating member. The rear portion of the accumulator accommodating bore is ventilated by way of a complex channel system, comprised of a transverse channel and ventilation slots provided between the motor flange and the accommodating member and between the motor mounting support and the accommodating member.

As an alternative to this presented ventilation concept, another embodiment of EP 0 787 084 B1 discloses connecting the rear chamber of the accumulator accommodating bore directly to the hollow space in the hood which is in fluid-tight abutment on the first housing surface of the accommodating member. Pressure compensation takes place by way of a ventilation point disposed in the hood. Leakage fluid of the pump is not hindered to propagate through the motor accommodating bore into the hood. Said hood accommodates electric and electronic components being disadvantageously exposed to moistening by fluid.

In view of the above, an object of the invention is to improve an immersion-proof hydraulic unit of the indicated type in such a fashion that the ventilation system can be manufactured in a simplified way, with the aim of avoiding the above-mentioned shortcomings.

DETAILED DESCRIPTION OF THE PREFERRED EMBODIMENTS

Figure 1:
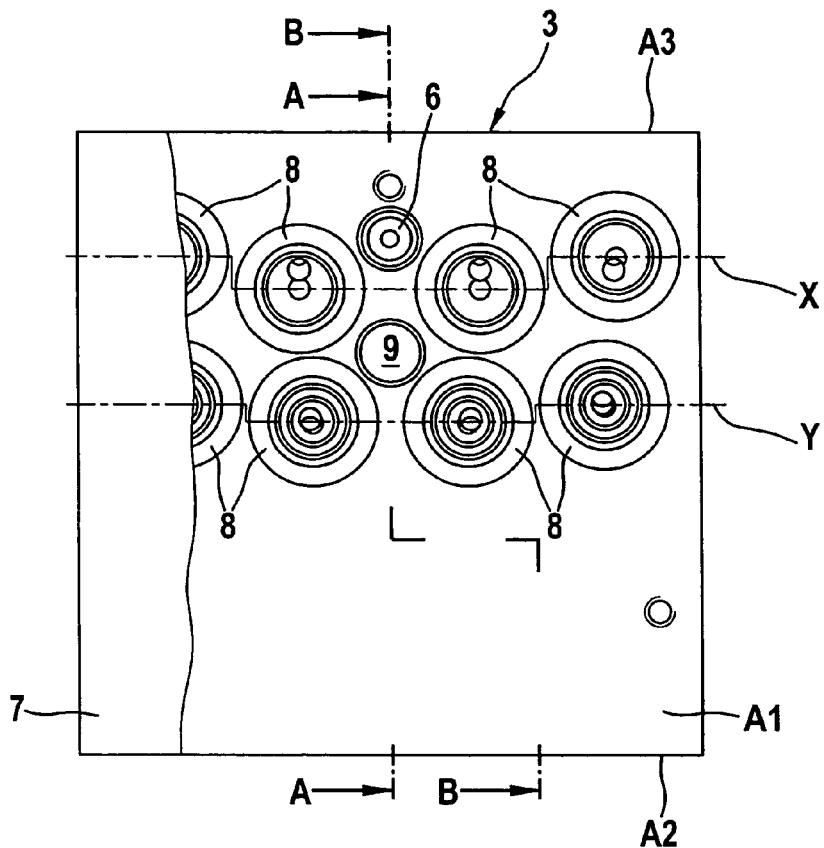
FIG. 1 is a top view of the first housing surface of the hydraulic unit.

FIG. 1 shows a hydraulic unit for slip-controlled brake systems in a top view of a block-shaped accommodating member 3 accommodating inlet and outlet valves in several valve accommodating bores 8 of a first and second valve row X, Y, said valves opening into a first housing surface A1 of the accommodating member 3. Said first housing surface A1 is disposed at right angles between a second and third housing surface A2, A3 which is limited by four lateral surfaces of the accommodating member 3 in total, the edges of which surfaces can be easily seen in FIG. 1. Further, sections of a hood 7 that is attached to the first housing surface A1 are sketched in the left-hand area of the accommodating member 3. Hood 7 is conformed to the contour of the accommodating member 3 and covers several inlet and outlet valves inserted into the valve accommodating bores 8. Electric controlling and/or regulating elements are arranged in hood 7 and connected to the inlet and outlet valves and to an electric motor that is arranged at a housing surface of the accommodating member 3 being positioned diametrically to the first housing surface A1.

Besides, FIG. 1 depicts a cable duct 9 between the two valve rows X, Y and, on top thereof, a pressure compensating channel 1 opening into the first housing surface A1. The vertical sectional planes A—A, B—B extend through the cable duct 9 and the pressure-compensating channel 1, illustrating hereinbelow by way of FIGS. 2, 3 the course of bores of the ventilation system within the accommodating member 3 that is relevant for the invention.

Figure 2:
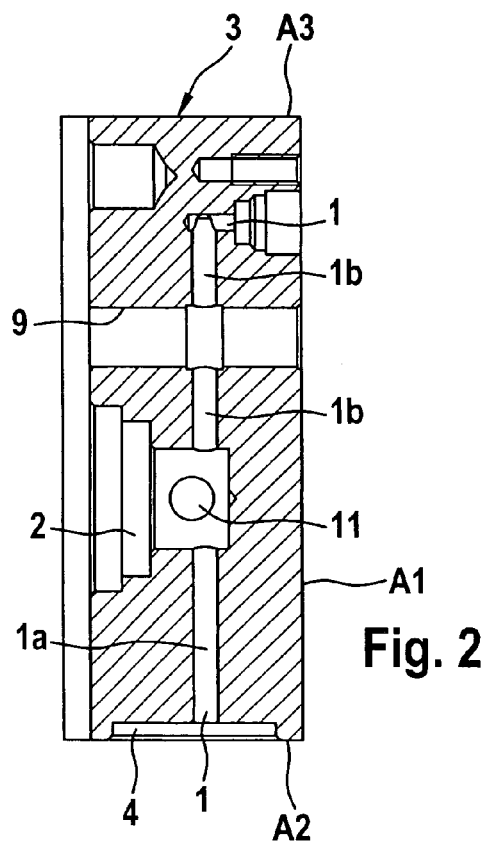
FIG. 2 is a side view of the accommodating member at the point of intersection A—A known from FIG. 1.

FIG. 2 discloses the design of the accommodating member 3 along the sectional plane A—A characterized in FIG. 1 and extending through the cable duct 9, the pressure compensating channel 1 and through the motor accommodating bore 2 that points transversely to the direction the pump accommodating bore 11 opens into the accommodating member 3.

The invention arranges that the pressure compensating channel 1, as seen from the second housing surface A2, traverses the motor accommodating bore 2 in the direction of the second housing surface A2 that is positioned diametrically to the third housing surface A3 and bounds the accommodating member 3. The pressure compensating channel 1 is configured as an angular channel and composed of a first and a second blind-end bore pointing to the accommodating member 3 in a particularly simple fashion, to what end the second blind-end bore forming a first and a second pressure compensating channel portion 1*a*, 1*b* opens into the second housing surface A2 and extends transversely through the motor accommodating bore 2 up to the ventilation point 6 which is a part of the first blind-end bore. The first blind-end bore opens into the first housing surface A1 and intersects with its end the end of the second blind-end bore to complete the angular channel. The ventilation point 6 includes an element 10 that is permeable to gas, yet impermeable to fluid, and is preferably composed of a semi-permeable membrane.

It can be taken from FIG. 2 that the second pressure compensating channel portion 1*b* extends between the motor accommodating bore 2 and the ventilation point 6 which opens as a stepped bore into the first housing surface A1 of the accommodating member 3 directly at the end of the second pressure compensating channel portion 1*b*. The second pressure compensating channel portion 1*b* traverses the cable duct 9, which is positioned in parallel to the valve accommodating bores 8 and arranged beside the motor accommodating bore 2. Cable duct 9 connects the electric motor inserted into the motor accommodating bore 2 to electric controlling and/or regulating elements arranged beside the first housing surface A1, preferably in hood 7.

Figure 3:
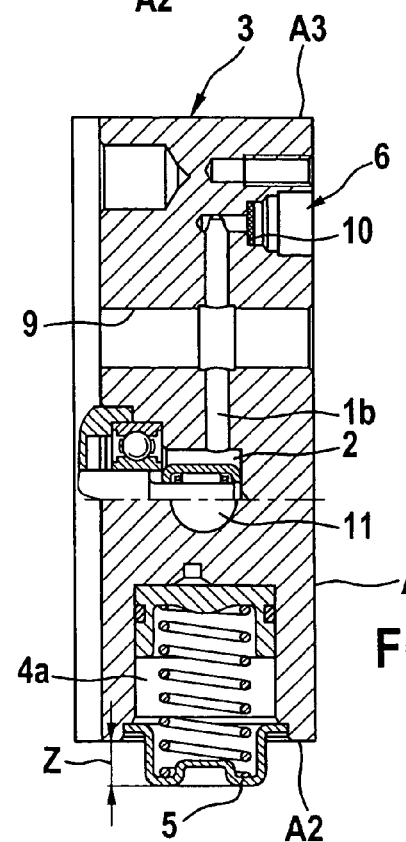
FIG. 3 is another side view of the accommodating member at the point of intersection B—B marked in FIG. 1.

FIG. 3 shows a cross-section through the accommodating member 3 starting from the illustration of the sectional plane B—B in FIG. 1. Identical with the sectional plane A—A, the sectional plane B—B initially extends along the second pressure compensating channel portion 1*b* up to the motor accommodating bore 2 and thereafter intersects the cross-sectional area of the accommodating member 3, in which the accumulator accommodating bore 4 is provided. The accumulator accommodating bore 4 houses a spring-loaded piston whose spring is supported on the cover 5 tightly closing the accumulator accommodating bore 4. Chamber 4a connected to the first pressure compensating channel portion 1a is disposed between the piston and the cover 5. Pressure compensation takes place through chamber 4a during the piston movement in the direction of the ventilation point 6, and pump leakage is accepted out of the motor accommodating bore 2 through the first pressure compensating channel portion (1a), to what end the absorptive volume of chamber 4 can be modified in conformity with demand by respectively designing the cover 5. Therefore, the cover 5 has a bowl-shaped design and includes a projecting length Z at the second housing surface A2 in order to increase the volume of leakage absorption.

FIG. 3 further shows the shaft portion of the electric motor necessary for the drive of the pump and substantially receiving the eccentric drive inserted into the motor accommodating bore 2. The eccentric drive actuates the piston pump inserted into the pump accommodating bore 11.

Figure 4:
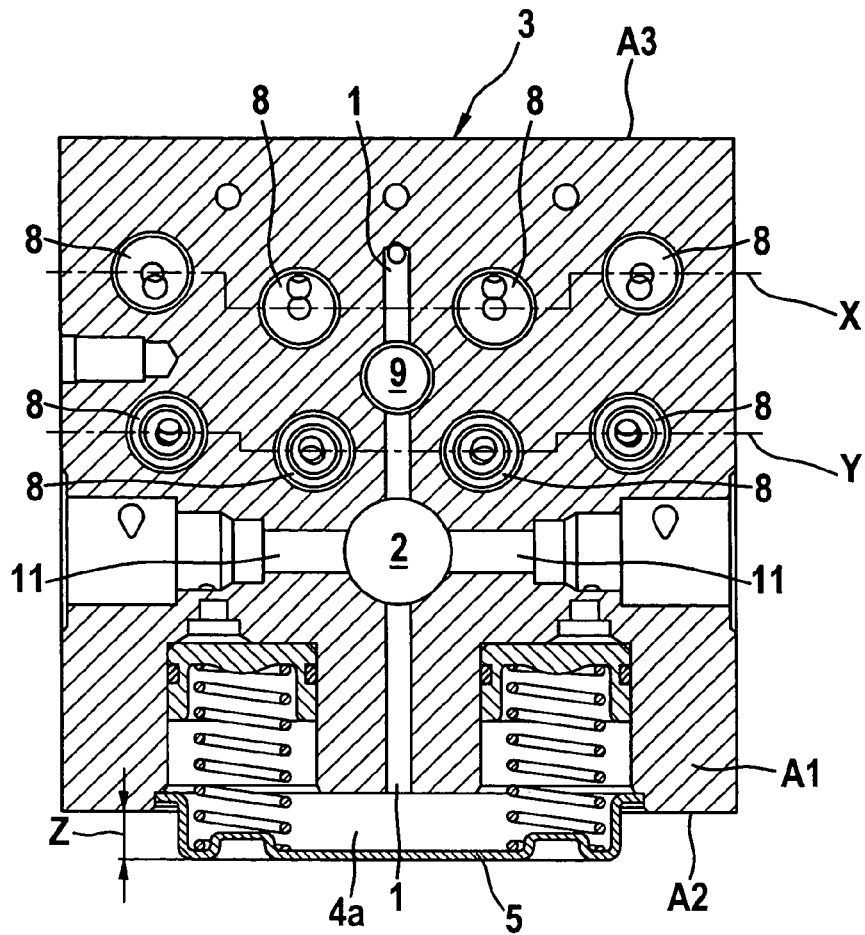
FIG. 4 is a cross-section taken through the accommodating member in the area of the pressure-balancing channel in the top view known from FIG. 1.

Instead of the top view of the first housing surface A1 known from FIG. 1, FIG. 4 shows a top view of a sectional surface which extends in approximation along half the block length of the accommodating member 3 and discloses the two valve rows X, Y with eight valve accommodating bores 8 similar to FIG. 1, and the pump accommodating bore 11 arranged exemplarily below the valve rows X, Y. The bore portion of bore 11 forming the pump suction side is respectively connected through a pressure fluid channel conducting the operating fluid to an accumulator accommodating bore 4 which adopts the function of a low pressure accumulator supplying the pressure fluid coming from the outlet valves to the pump. Two parallel arranged accumulator accommodating bores 4 open into the second housing surface A2 at a radial distance from each other. Within this radial distance, the pressure compensating channel 1 extends centrically and thus mirror-symmetrically through the accommodating member 3 from the second housing surface A2 to the ventilation point 6. Both accumulator accommodating bores 4 are closed by one single trough-shaped cover 5.

Figure 5:
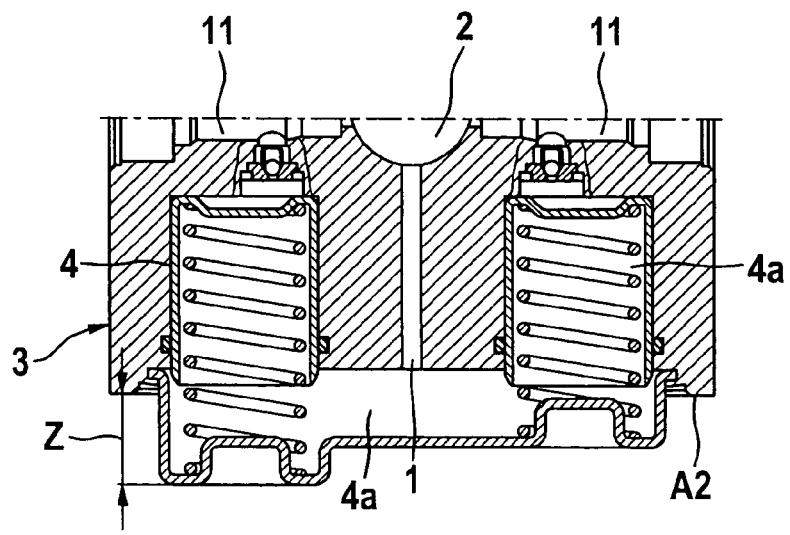
FIG. 5 is an alternative design of a cover for closing two accumulator accommodating bores.

The attachment of a one-part cover 5 for the tight closure of both accumulator accommodating bores 4 is equally shown in an enlarged view of FIG. 5 on the basis of the illustration according to FIG. 4. Said cover 5 is made by non-cutting metal shaping, preferably in deepdrawing, stamping or extruding operations. The pistons inserted into the accumulator accommodating bores 4 are manufactured in the same way. The pressure compensating channel 1 extends up to the cover 5 which, in the present example, has an additional indentation below the one accumulator accommodating bore within its trough contour. Any possible leakage of the pump can initially be admitted in the indentation. At its edge bent at right angles, cover 5 is attached by means of calking of the housing material of the accommodating member 3. Of course, other equivalent attachment provisions by way of operative engagement and molecular bond are also possible.

Of course the accommodating member 3 also comprises several pressure fluid channels connecting the valve-, pump- and accumulator-accommodating bores and permitting a hydraulic connection between a pressure fluid generator and at least one pressure fluid receiver. However, in order not to become confused, it is omitted to illustrate all pressure fluid channels in which the operating fluid is conveyed.

Rather, the description concentrates on the essential design innovations for configuring a ventilation system that allows ventilating and venting the pump accommodating bore 11 and the accumulator accommodating bore 4 for pressure compensation to the atmosphere exclusively by way of one single ventilation point 6, to what end the invention focuses on the arrangement and construction of a pressure compensating channel 1, which additionally allows a storage of pump leakage in the area of the accumulator accommodating bore 4.

Finally, it shall not be left unmentioned that, under the proviso of sufficient space, the pressure compensating channel 1 is manufactured as the only through-bore instead of a blind-end bore so that the through-channel 1 is made in a particularly simple drilling operation in conformity with the demands of automation to extend from the second housing surface A2 to the third housing surface A3, which includes the ventilation point 6 with the fluid-impermeable element 10.

The invention is advantageous in that, upon request or requirement, one single element 10 can also be arranged in hood 7 so that the ventilation of the accumulator accommodating bores 4 and the pump- and motor accommodating bores 11, 2 is carried out through the ventilation point 6 arranged in the first housing surface A1 in the direction of the large-volume hollow space of the hood 7, which has a connection to the atmosphere through the element 10 especially when the hood 7 is sealed at the accommodating member 3.

The invention claimed is:

1. Hydraulic unit for brake systems, comprising:
    an accommodating member accommodating inlet and outlet valves in several valve accommodating bores of a first and second valve row, said valves opening into a first housing surface of the accommodating member that is disposed at right angles between a second and third housing surface,
    a pump accommodating bore arranged in the accommodating member and pointing transversely to the direction the valve accommodating bores open into the accommodating member,
    a motor accommodating bore arranged in the accommodating member for driving a pump inserted into the pump accommodating bore, to what end the motor accommodating bore is aligned transversely to the pump accommodating bore,
    at least one accumulator accommodating bore opening into the accommodating member into the second housing surface,
    including a ventilation system that permits ventilating and venting the pump- and accumulator accommodating bore for pressure compensation exclusively by way of one single ventilation point that is in connection to a pressure compensating channel of the ventilation system, the ventilation point including an element that is permeable to gas, yet impermeable to fluid, wherein the pressure-compensating channel extends transversely to the motor- and pump accommodating bore from the second housing surface through the motor accommodating bore in the direction of the third housing surface in the accommodating member positioned diametrically to the second housing surface.

2. Hydraulic unit as claimed in claim 1,
    wherein a first pressure compensating channel portion extends between the motor accommodating bore and a cover closing the accumulator accommodating bore and being attached to the second housing surface.

3. Hydraulic unit as claimed in claim 1,
    wherein a first pressure compensating channel portion extends between the motor accommodating bore and a cover closing the accumulator accommodating bore and being attached to the second housing surface; or wherein two parallel arranged accumulator accommodating bores open into the second housing surface at a radial distance from each other in which the first pressure compensating channel portion extends between the motor accommodating bore and a cover closing the two accumulator accommodating bores.

4. Hydraulic unit as claimed in claim 2,
wherein a discharge of pump leakage from the motor accommodating bore to the accumulator accommodating bore is carried out through the first pressure compensating channel portion into a chamber associated with the accumulator accommodating bore, and an absorptive volume of said chamber is variable by way of a design of the cover;
wherein a first pressure compensating channel portion extends between the motor accommodating bore and a cover closing the accumulator accommodating bore and being attached to the second housing surface; and
wherein two parallel arranged accumulator accommodating bores open into the second housing surface at a radial distance from each other in which the first pressure compensating channel portion extends from the motor accommodating bore up to the cover that closes the two accumulator accommodating bores.

5. Hydraulic unit as claimed in claim 4, wherein the cover has a bowl-shaped design and includes a projecting length to increase the absorptive volume of the chamber.

6. Hydraulic unit as claimed in claim 2, wherein the cover is made by non-cutting metal shaping.

7. Hydraulic unit as claimed in claim 2, wherein the cover is made by deepdrawing plastic material.

8. Hydraulic unit as claimed in claim 1, wherein a second pressure compensating channel portion extends between the motor accommodating bore and the ventilation point, which is fitted at an end of the second pressure compensating channel portion either directly in the accommodating member or in a hood that is sealedly seated onto the first housing surface of the accommodating member.

9. Hydraulic unit as claimed in claim 8, wherein the hood covers several inlet and outlet valves inserted into the valve accommodating bores and connected to electric controlling and/or regulating elements that are arranged in the hood.

10. Hydraulic unit as claimed in claim 1, wherein the pressure compensating channel is configured as an angular channel formed of a first and a second blind-end bore, with the second blind-end bore comprised of two pressure compensating channel portions opening into the second housing surface and being led transversely through the motor accommodating bore up to the ventilation point, and wherein the first blind-end bore opens into the first housing surface and intersects the second blind-end bore.

11. Hydraulic unit as claimed in claim 10, wherein one of the pressure compensating channel portions traverses a cable duct which is positioned in parallel to the valve accommodating bores and arranged beside the motor accommodating bore and connects an electric motor inserted into the motor accommodating bore to electric controlling and/or regulating elements that are arranged beside the first housing surface.

12. Hydraulic unit as claimed in claim 2, wherein a first pressure compensating channel portion extends between the motor accommodating bore and a cover closing the accumulator accommodating bore and being attached to the second housing surface, preferably in an operative engagement or a molecular bond; or
wherein two parallel arranged accumulator accommodating bores open into the second housing surface at a radial distance from each other in which the first pressure compensating channel portion extends from the motor accommodating bore up to the cover that closes the two accumulator accommodating bores.

13. Hydraulic unit as claimed in claim 1, wherein a discharge of pump leakage from the motor accommodating bore to the accumulator accommodating bore is carried out through a first pressure compensating channel portion into a chamber associated with the accumulator accommodating bore, and an absorptive volume of said chamber is variable by way of a design of the cover;
wherein a first pressure compensating channel portion extends between the motor accommodating bore and a cover closing the accumulator accommodating bore and being attached to the second housing surface, preferably in an operative engagement or a molecular bond; and
wherein two parallel arranged accumulator accommodating bores open into the second housing surface at a radial distance from each other in which the first pressure compensating channel portion extends from the motor accommodating bore up to the cover that closes the two accumulator accommodating bores.

14. Hydraulic unit for brake systems, comprising:
an accommodating member accommodating inlet and outlet valves in several valve accommodating bores of a first and second valve row, said valves opening into a first housing surface of the accommodating member that is disposed at right angles between a second and third housing surface,
a pump accommodating bore arranged in the accommodating member and pointing transversely to the direction the valve accommodating bores open into the accommodating member,
a motor accommodating bore arranged in the accommodating member for driving a pump inserted into the pump accommodating bore, to what end the motor accommodating bore is aligned transversely to the pump accommodating bore,
at least one accumulator accommodating bore opening into the accommodating member into the second housing surface,
several pressure fluid channels that connect the valve-, pump- and accumulator accommodating bores and are adapted to provide a hydraulic connection between a pressure fluid generator and at least one pressure fluid receiver,
including a ventilation system that permits ventilating and venting the pump- and accumulator accommodating bore for pressure compensation exclusively by way of one single ventilation point that is in connection to a pressure compensating channel of the ventilation system, the ventilation point including an element that is permeable to gas, yet impermeable to fluid, wherein the pressure-compensating channel extends transversely to the motor- and pump accommodating bores from the second housing surface through the motor accommodating bore in the direction of the third housing surface in the accommodating member positioned diametrically to the second housing surface.

15. Hydraulic unit as claimed in claim 14, wherein a first pressure compensating channel portion extends between the motor accommodating bore and a cover closing the accumulator accommodating bore and being attached to the second housing surface.

16. Hydraulic unit as claimed in claim 14, wherein a first pressure compensating channel portion extends between the motor accommodating bore and a cover closing the accumulator accommodating bore and being attached to the second housing surface; or wherein two parallel arranged accumulator accommodating bores open into the second housing surface at a radial distance from each other in which the first pressure compensating channel portion extends between the motor accommodating bore and a cover closing the two accumulator accommodating bores.

17. Hydraulic unit as claimed in claim 15, wherein a discharge of pump leakage from the motor accommodating bore to the accumulator accommodating bore is carried out through the first pressure compensating channel portion into a chamber associated with the accumulator accommodating bore, and an absorptive volume of said chamber is variable by way of a design of the cover;

wherein a first pressure compensating channel portion extends between the motor accommodating bore and a cover closing the accumulator accommodating bore and being attached to the second housing surface; and wherein two parallel arranged accumulator accommodating bores open into the second housing surface at a radial distance from each other in which the first pressure compensating channel portion extends from the motor accommodating bore up to the cover that closes the two accumulator accommodating bores.

18. Hydraulic unit as claimed in claim 17, wherein the cover has a bowl-shaped design and includes a projecting length to increase the volume of the chamber.

19. Hydraulic unit as claimed in claim 15, wherein the cover is made by non-cutting metal shaping.

* * * * *